Aug. 12, 1958 R. L. PROPST 2,846,737
JOINT CONNECTION
Filed Sept. 30, 1957

INVENTOR.
ROBERT L. PROPST

BY *Philip H. Sheridan*

ATTORNEY

United States Patent Office 2,846,737
Patented Aug. 12, 1958

2,846,737

JOINT CONNECTION

Robert L. Propst, Englewood, Colo., assignor to Beauty Products, Ltd., Denver, Colo., a corporation of Colorado Application September 30, 1957, Serial No. 687,054

5 Claims. (Cl. 20—92)

This invention relates to a new article of manufacture and particularly to a joint connection or fastener system for joining and locking two members at their meeting faces.

Reference is made to U. S. patent application Serial No. 541,929, filed October 21, 1955, in the name of Robert L. Propst, to application Serial No. 667,515, filed on June 24, 1957, in the name of said Propst, and to design patent application Serial No. 46,701, filed June 23, 1957, also in the name of Propst, said applications and the present invention having been assigned to a common assignee. In these applications there is disclosed a connector for joining and locking two wooden members at their meeting faces, the connector including an elongated body portion and spaced angled wings, the latter being receivable in spaced cooperating angled sockets in the members, and the elongated portion being received in a longitudinal groove or grooves in one or both of the faces whereby when the connector is properly positioned and locked, the faces of the two members directly abut each other and are locked together. It is pointed out in detail in said application Serial No. 667,515 that it is highly essential in order to properly assemble and lock the members with this particular connector that the spaced angled sockets or holes in the members to be locked or joined must be positioned and spaced therein with a high degree of accuracy and such is the purpose of the drilling jig and combined drill and jig disclosed in said latter application. The present invention utilizes the described connector, but permits a joint connection for wooden members without the necessity of providing accurately spaced circular holes in the meeting faces of the members being joined and thus there is eliminated in the present invention much of the difficulty encountered in the past.

Thus it is an object of this invention to provide a joint connection of the type described which requires no drilling of holes to receive the angled wings of the connector element.

A further object of this invention is to provide a joint connection wherein the meeting faces the members being joined are provided with longitudinal grooves containing receiver strips having therein slots for receiving the spaced wings of the connector.

Yet another object is to provide a joint connection as described wherein there is a high degree of accuracy in assembling the members and wherein the receiver strips which receive the wings of the connector have resilient characteristics to permit a desired amount of "give" in assembling the joint and "recovery" in the event of a damaging blow to the assembled joint.

Other objects and advantages of the invention will become apparent upon considering the following detailed description in conjunction with the drawings wherein a single embodiment depicting the invention is illustrated and wherein like numerals represent similar parts throughout and wherein.

Figure 1:
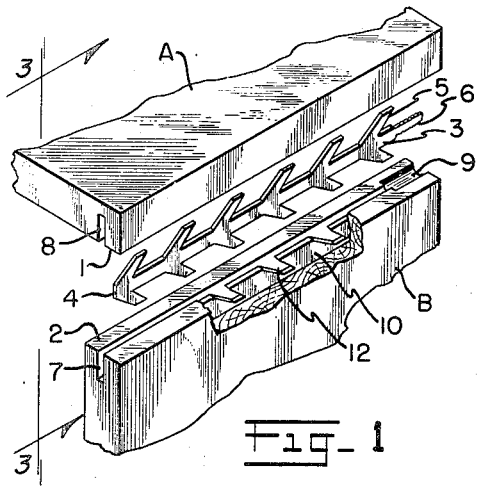
Figure 1 is a diagrammatic, partly broken away, perspective view of a portion of the joint connection of this invention.

Prior to describing the parts in detail, it should be mentioned that the joint connection to which this invention is specifically applicable generally involves joining parts made from wooden material or some equivalent thereof. However, the scope of this invention is not to be so limited as the principles could readily apply to joining metal or plastic units. In Figure 1 there is illustrated a wooden panel element A which is to be connected to wooden panel element B so that the meeting faces 1 and 2 thereof abut and are more or less drawn together in locked and binding relationship. Numeral 3 represents a connector element clearly described in said applications and including a main body portion 4 and spaced cooperating and mating angled wings 5, each of which have straight ends and sides, although the sides taper away from the body portion 4. At one terminal end of the connector 3 it is threaded as at 6. As described in said applications, it has been the practice in the past to provide, when assembling the panels A and B, mating longitudinal grooves 7, 8 and mating relieved areas 9 in the respective panels and thereafter drilling mating holes in the meeting faces for receiving the angled wings 5. Although such has proved generally satisfactory, it has been found that the spacing of the drilled holes must be very accurate so that they will properly correlate and receive the spaced wings 5, and furthermore since the wings are preferably flat in shape there is actually too great a play of the wings within the holes and this has been found to be detrimental. These disadvantages are only a few of those overcome by the present invention.

Figure 3:
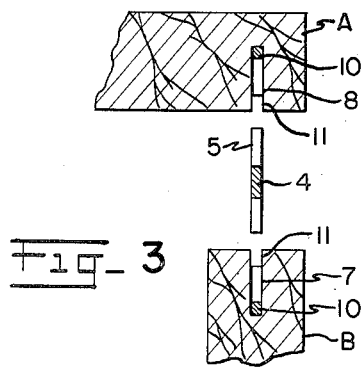
Figure 3 is a sectional view taken along the lines 3—3 of Figure 1.
Figure 4:
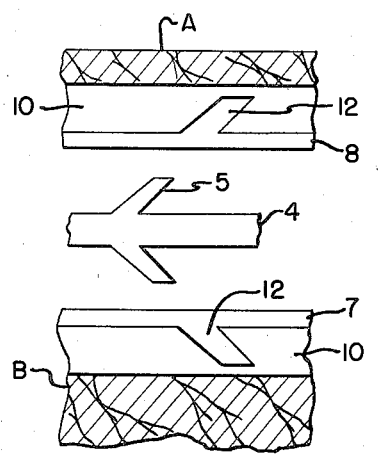
Figure 4 is a diagrammatic front elevational view of a part of the joint illustrated in Figure 1.
Figure 5:
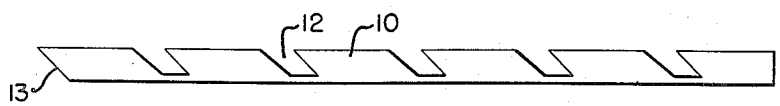
Figure 5 is a plan view of a receiving strip member utilized in the joint connection of Figure 1.

Referring to Figure 5, there is shown a receiver strip member 10 which if desired may be substantially rectangular as illustrated and of a length comparable to and width to fit within the longitudinal grooves 7 and 8, it being noted that one end of the strip 10 is beveled at 13. However, the height of each member 10 is less than the depth of each groove 7 and 8 an amount corresponding to that represented by 11 in Figure 3 which is approximately equal to one-half the width of body portion 4. There is provided in member 10 a plurality of spaced slots 12 which may be stamped therefrom by any suitable means. Following the formation of member 10, one of each is inserted within a longitudinal groove 7 or 8 as illustrated in Figure 3, whereby the slots 11 open towards the top of grooves 7 and 8 and the bottom of members 10 as viewed in Figure 5 rest at the bottom of grooves 7 and 8. Any suitable means may be employed for integrally securing a member 10 in each groove 7 and 8, such as ordinary glue or cement, and member 10 may be made of various material having slightly resilient characteristics such as plastic, wood, masonite or even a durable paper product. One possibility is to use high impact polystyrene to manufacture elements 10 and in that instance it is only necessary to employ well known solvents to dissolve the surface of elements 10 and integrally secure same within grooves 7 and 8. Such solvents, for example benzene or methyl ethyl ketone, dissolve the styrene surface which in turn seeps into the surface of the wood of members A or B to cause the bond. As a further means for connecting the members 10 in the grooves, induction heating may be employed. It is preferable to use a material having resilient characteristics for construction of strip 10 and, of course, if the panels A and B are metal other types of bonding agents would be employed.

Figure 2:
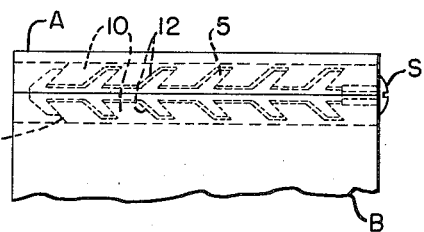
Figure 2 is an elevation view of the assembled joint connection of Figure 1.

To repeat slightly, in order to provide the joint of Figure 2, mating grooves 7 and 8 and relieved areas 9 are formed in the faces 1 and 2 of panels A and B. Next, a receiver strip 10 is integrally secured within each groove 7 and 8 as illustrated with the beveled end 13 of each positioned remote from areas 9. Thereafter a connector 3 is put in place, with the mating wings 5 being received in mating slots 12 with the exception of the pair of mating wings most remote from end 6 and, as shown in Figure 2, such last named wings abut against mating ends 13. These ends 13 are parallel with the wall of each slot 12 which is engaged by the side of a wing 5, the latter also being in a plane substantially parallel with the plane of wall 13 and, in effect, wall 13 in combination with the portion of groove 7 or 8 next adjacent thereto forms a slot that functions the same as slots 12 and reference in the claims to "slots" in the receiver strip is meant to include such. Furthermore, if desired, each strip 10 could be extended at end 13 to terminate similar to the other end whereupon the ends of strip 10 would be flush with the ends of a slot 7 or 8 and in this case there would actually be in each strip 10 an additional slot 12 including bevel 13 as one of its walls. Finally, screw S is applied to pull the wings and strips into binding and positive contact and in turn lock the panels A and B together with faces 1 and 2 thereof abutting.

It will be noted that the connector 3 is concealed when assembled or, in other words, the connector is an internal clamp, preferably of steel or other suitable metal, which tightly grips and holds along the entire length of the joint. Furthermore, the joint will flex instead of breaking and only normal working tolerances are required. By use of strips 10, the accuracy of the joint is based on that of the connector 3 and not, as in Serial No. 667,515, the drilled holes in addition. Also there is no play or problem in forming the slots 12 as long as they are slightly larger than wings 5 and, of course, the rubbery, resilient, or "give" quality of strips 10 is an important controlling characteristic. The wings or ribs 5 draw against the mating slots in the receiver inserts or strips 10 located in grooves or kerfs 7 and 8 to pull the joint faces 1 and 2 into strong positive contact. The body 4 seats within the combined slots 7 and 8, thus providing effective keying for accurate joint alignment.

Although this invention obviously is designed for permitting detachable connections or fastenings of panel members and the like, perhaps most important is the fact that it provides a system for the fabrication and assembly of cases, cabinets and many furniture articles. For example, the sides, back, bottom, top and end walls of a cabinet having its front closed by drawers or sliding doors may be manufactured and shipped in knock-down condition for sale or delivery to the customer. Such walls, with the exception of the back wall, would be made with the longitudinal grooves 7 or 8 therein, the enlarged areas 9 and the receiver strips integrally secured in the grooves. The knock-down kit, which could be freighted at a much lower cost than the assembled cabinet, would contain the necessary number of connectors 3 and cap screws S and the purchaser would have little trouble in fabricating and assembling the cabinet to provide a permanent installation.

Let us assume that panel A is the top wall of such a wooden cabinet and panel B is one of the side walls. The manufacturer would have provided the mating longitudinal grooves 7 and 8 in the faces 1 and 2, respectively, together with the mating enlarged areas 9 adapted to receive the screw cap S, and finally the receiving strips would be integrally secured within the grooves 7 and 8. The kit would include the connector 3 and cap S and the customer would only have to insert the connector 3 in proper position and apply cap S to form a connection uniting panels A and B. Of course, in connection with a cabinet the back wall would be provided with an opening through which cap S would extend and the back wall would be interposed between panels A and B and the head of cap S. For example, considering a cabinet having a bottom, side walls, a top, a back wall and an open front, then a joint as shown in Figure 2 would be provided to connect each side wall to the top and bottom walls and the back wall would be held in position by the caps S of each joint, four in all. This would result in use of the present invention to more or less permanently assemble various elements of an article, such as a cabinet.

The objects and advantages of this invention are believed to be apparent in view of the above detailed description, it being understood that the invention is to be limited only in accordance with the scope of the appended claims as various alterations and modifications within this scope are intended. For example, it is not necessary that a space 11 be provided in each panel, but instead the body portion 4 could be housed completely within one panel groove 7 or 8 in which event the top of the receiver strip in the other groove would be flush with surface 1 or 2. Further, space 11 in each groove could be unequal in size. By referring to Figure 2, it will be noted that the slots 12 are large enough to provide a space adjacent the non-gripping side and tip of each wing 5 for the purpose of self-adjustment of the spline 3 and to equalize any error and it is to be understood that the size of such free spaces may be varied to fit the circumstances. Still further, although preferably the strips 10 are made of resilient material for the reasons stated and to provide a means for absorbing any damaging blow to the assembled joint, if one is primarily concerned with only maximum strength, the strips 10 may be made of a suitable metal.

What is claimed is:

1. A joint connection of the type described including at least a first member connectable to a second member with both members having meeting faces in the area of connection comprising an elongated element having a body portion and spaced cooperating angled wings extending therefrom, each of said faces being grooved, insert means integrally secured in each groove, each insert means having spaced cooperating angled slots therein for receiving the spaced cooperating angled wings, and means cooperating with the body portion after the wings are received in the slots for securing the members together and for drawing the faces into binding and locked engagement.

2. A joint connection as defined in claim 1 wherein the groove extends longitudinally in each face and the insert means comprises an elongated member extending from the bottom of a groove to at least adjacent the top of a groove.

3. A joint connection as defined in claim 2 wherein the longitudinal grooves are of a combined depth to receive both the elongated members and the elongated body portion of the element whereby the faces of the first and second members directly abut each other when locked together.

4. A joint connection as defined in claim 3 wherein each elongated member is made of material having resilient characteristics.

5. A joint connection as defined in claim 4 wherein the cooperating angled wings are mating and the cooperating slots of both elogated members are mating.

No references cited.